US006237795B1

(12) United States Patent
Buckley et al.

(10) Patent No.: US 6,237,795 B1
(45) Date of Patent: May 29, 2001

(54) MODULAR TRANSPORT CONTAINER FOR SATELLITES

(75) Inventors: Steven Buckley, Edgewood; Eugene Fosness; Steven F. Griffin, both of Albuquerque; Keith Denover; Peter Wegner, both of Tijeras; Joel Gussy; Steven A. Lane, both of Albuquerque; Sirirak Denover, Tijeras, all of NM (US)

(73) Assignee: The United States of America as represented by the Secretary of the Airforce, Washington, DC (US)

( * ) Notice: Subject to any disclaimer, the term of this patent is extended or adjusted under 35 U.S.C. 154(b) by 0 days.

(21) Appl. No.: 09/580,191

(22) Filed: May 26, 2000

(51) Int. Cl.$^7$ ..................................... B65D 19/04
(52) U.S. Cl. .......................... 220/1.5; 220/592; 206/386; 206/521; 206/591
(58) Field of Search ................................. 220/1.5, 592.2, 220/592.25; 206/386, 583, 521, 591

(56) References Cited

U.S. PATENT DOCUMENTS

| | | | | |
|---|---|---|---|---|
| 4,729,478 | * | 3/1988 | Thomas | 206/591 |
| 4,887,537 | * | 12/1989 | Kellogg . | |
| 5,109,985 | * | 5/1992 | Rose | 206/600 |
| 5,111,937 | * | 5/1992 | Schutz | 206/386 |
| 5,704,476 | * | 1/1998 | Abbott | 220/1.5 |
| 5,829,595 | * | 11/1998 | Brown et al. | 220/1.5 |
| 5,938,037 | * | 8/1999 | Essary | 220/1.5 |
| 6,006,918 | * | 12/1999 | Hart | 220/1.5 |
| 6,024,223 | * | 2/2000 | Ritter | 220/1.5 |

* cited by examiner

Primary Examiner—Joseph M. Moy
(74) Attorney, Agent, or Firm—Kenneth E. Callahan (57) ABSTRACT

A modular reusable transport container system is described for safely transporting small or medium size satellites and other sensitive cargo. The invention incorporates shock and vibration isolation systems, environmental control systems, integrated power converters, battery backup systems, and monitoring systems.

5 Claims, 12 Drawing Sheets

MODULAR TRANSPORT CONTAINER FOR SATELLITES

STATEMENT OF GOVERNMENT INTEREST

The conditions under which this invention was made are such as to entitle the Government of the United States under paragraph 1(a) of Executive Order 10096, as represented by the Secretary of the Air Force, to the entire right, title and interest therein, including foreign rights.

BACKGROUND OF THE INVENTION

1. Field of the Invention

The present invention is in the field of transport containers for launch vehicle payloads, and in particular relates to a class of spacecraft in the 150-kg to 600-kg weight range.

2. Description of the Prior Art

Satellite manufacturing facilities may be thousands of miles away from the designated launch sites. Some launch sites are in remote areas and are accessible only by rough terrain. Often, satellites must be transported over land, sea and air. Special considerations must be made to monitor and regulate temperature, humidity, air quality, vibration, and shock levels during transport. Vibration and shock during transport and launch is the leading cause of satellite failure on orbit.

Many prior art transport containers employ some degree of shock and vibration isolation. However, typical isolation mechanisms are not sufficient for transporting medium sized (150 kg to 600 kg) sensitive satellites over rough terrain, or in situations where the cargo may be exposed to severe vibration or shock environments. (See U.S. Pat. Nos. 4,729, 478, 4,887,537, and 6,036,007). Some shipping containers have been designed specifically to protect delicate electronic equipment from vibration and environmental contamination, but do not provide adequate vibration protection, climate control, or monitoring capabilities necessary for transporting satellites (U.S. Pat. No. 4,602,715). Several shipping containers have been designed to be adjustable, reusable, and/or modular, but are designed for general cargo and would provide only minimal protection (U.S. Pat. No. 4,785,957 and 5,452,811). The device described in U.S. Pat. No. 4,836,379 is modular and includes some shock absorbing elements, but would not provide adequate vibration protection for a several hundred kilogram satellite, nor does it include necessary environmental controls and monitoring systems (U.S. Pat. No. 4,836,379).

Many prior art shipping containers use composite materials in their designs but are typically for shipping bulk liquid cargo. They do not include adequate vibration protection or the necessary environmental controls and monitoring systems (U.S. Pat. No. 5,738,240, 5,029,734 and 5,110,000). The device taught by U.S. Pat. No. 60,288,293 includes a temperature control mechanism, but the container was designed specifically for transporting biological and skin samples. Thus, it is not appropriate in size for satellite transport, nor does it include vibration protection or monitoring capabilities (U.S. Pat. No. 60,288,293). The device taught by U.S. Pat. No. 6,046,678 is strictly a monitoring device for storage and transport containers that consists of sensors, electronics and alarm systems. It does not address a particular shipping container or application, and does not address vibration isolation, or a means to regulate environmental parameters (U.S. Pat. No. 6,046,678). The container described by U.S. Pat. No. 4,771,971 is strictly for transporting cargo on launch and in orbit, and was not designed for ground transportation (U.S. Pat. No. 4,771,971). None of the prior art shipping containers address and incorporate all of the necessary systems required for the transportation of medium size satellites and launch vehicle payloads.

Satellites are currently transported in customized, single-use shipping containers. These containers are made from various types of materials, ranging from plywood to steel. Transportation of satellites is expensive since there are no standard, reusable containers available.

SUMMARY OF THE INVENTION

The present invention is a terrestrial transport container for safely transporting medium size (150 kg to 600 kg) satellites and other rocket payloads from a manufacturing or assembling facility to the launch site. This transport container is manufactured using lightweight, durable, and chemically resistant composites, and includes mechanisms to monitor and control vibration levels, temperature, humidity, and air quality. The proposed design includes adjustable vibration isolation to permit the use of the container with a variety of payload weights. The transport container is modular to allow for different size payloads, and is reusable. Included in this container is a means to produce a positive-pressure nitrogen purge within the container to maintain a clean environment and prevent the satellite's exposure to humidity. This invention includes a power converter apparatus and a battery, and can be powered from a variety of AC and DC power supplies, in addition to its battery. The modular transport container can be mounted on commonly used Air Force cargo pallets, and can be used to transport military or commercial satellites.

BRIEF DESCRIPTION OF THE DRAWINGS

The various features of novelty that characterize the invention are pointed out with particularity in the claims annexed to and forming a part of this disclosure. For a better understanding of the invention, its operating advantages, and specific objects attained by its uses, reference is made to the accompanying drawings and descriptive matter in which a preferred embodiment of the invention is illustrated.

DETAILED DESCRIPTION

Figure 1:
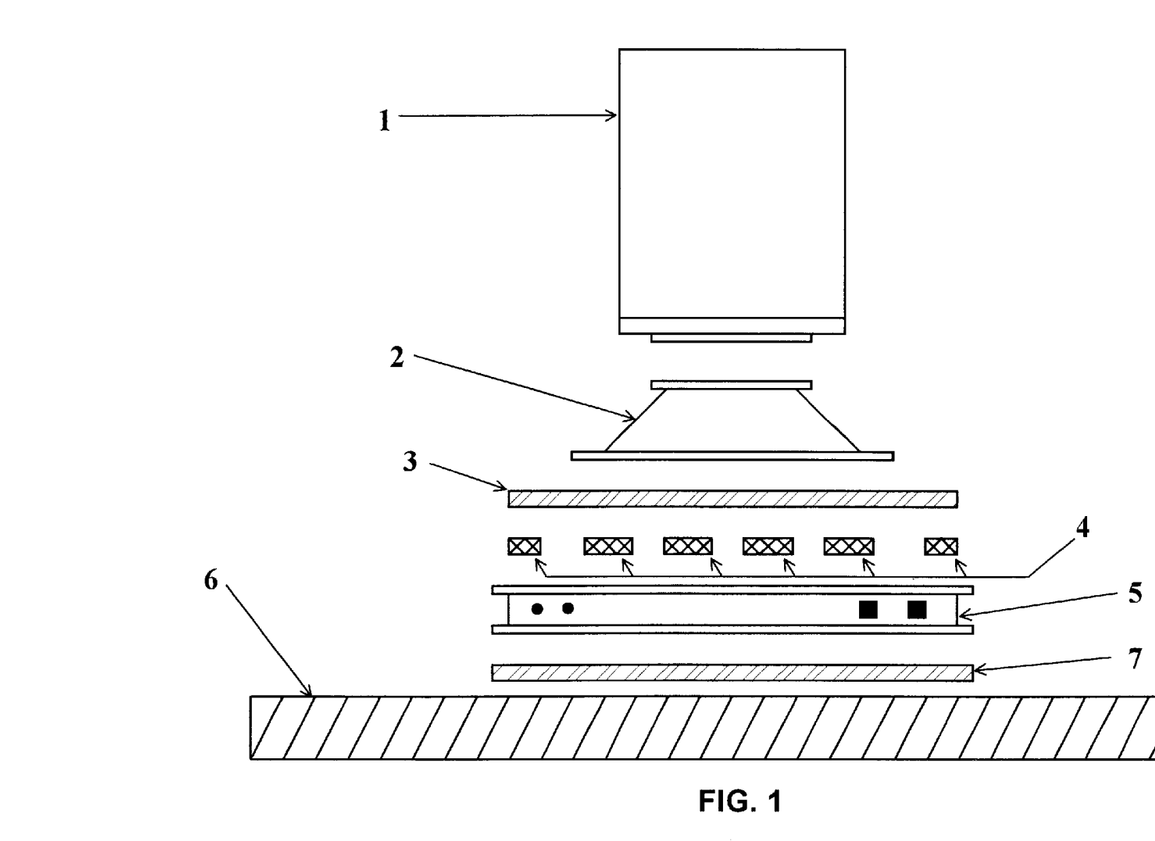
FIG. 1 illustrates the modular satellite transport container with the mounting platform attached to the isolators.

FIG. 1 illustrates an embodiment of the modular transport container for satellites with the mounting platform attached to isolators. A satellite 1 is typically mounted on an adapter ring 2 at the satellite's manufacturing facility. Packaging of the satellite for transport is performed in clean-room facilities. Once the satellite has been delivered to the launch site, it is unpacked in a clean-room facility and integrated onto the launch vehicle. The container generally consists of a mounting assembly located between the satellite and the pallet, an environmental cover of cylindrically-shaped shroud sections varying in number according to satellite size, and external systems for maintaining the desired environment within the environmental cover.

In the present invention, the satellite 1 and the adapter ring assembly 2 are mounted onto a shock and vibration isolation system consisting of a circular (aluminum) mounting platform 3 and multiple individual isolators 4. The mounting platform has openings for the passage of a gas (e.g., nitrogen). The isolators consist of passive members made up of adjustable spring and damper elements that provide stiffness and damping. In the embodiment shown in FIG. 1, the satellite assembly and isolation system are attached to a base ring 5, which is rigidly mounted to the shipping pallet 6. A gasket seal 7 is used to provide an airtight seal with the pallet 6.

Figure 2:
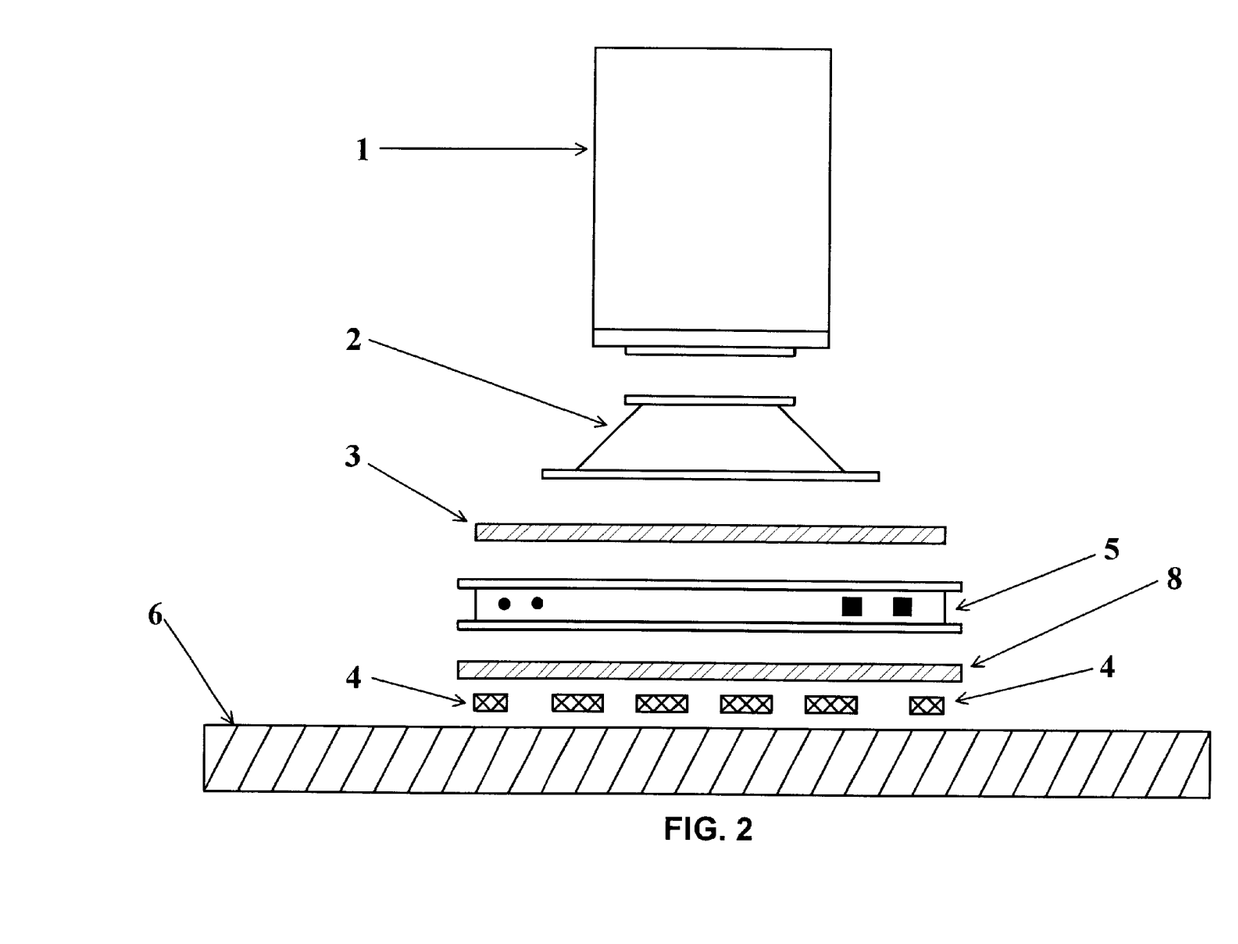
FIG. 2 illustrates the satellite container with the isolators mounted directly to the pallet.

In an alternative embodiment, shown in FIG. 2, the mounting platform 3 can be directly mounted to the base ring 5, which is then attached and sealed to a circular aluminum bottom plate 8 to make the container airtight. The assembly is then attached to the isolators 4, which are attached directly to the pallet 6. In the first embodiment, the satellite 1 is permitted to move relative to the base ring 5. In the second embodiment, there is no relative motion between the base ring 5 and the satellite 1. The configuration used determines the total mass being isolated and will determine the required isolator parameters (stiffness and damping).

Figure 3:
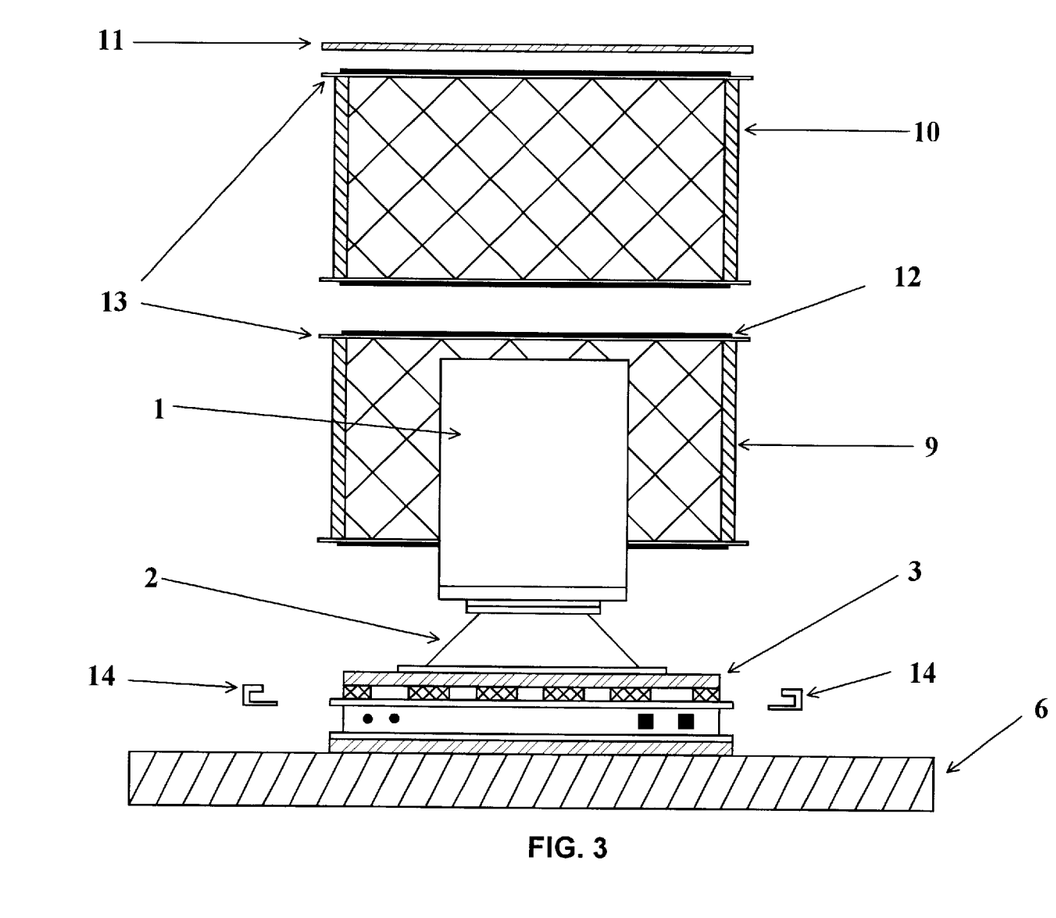
FIG. 3 shows the satellite mounting assembly, composite shell apparatus, and lid.
Figure 4:
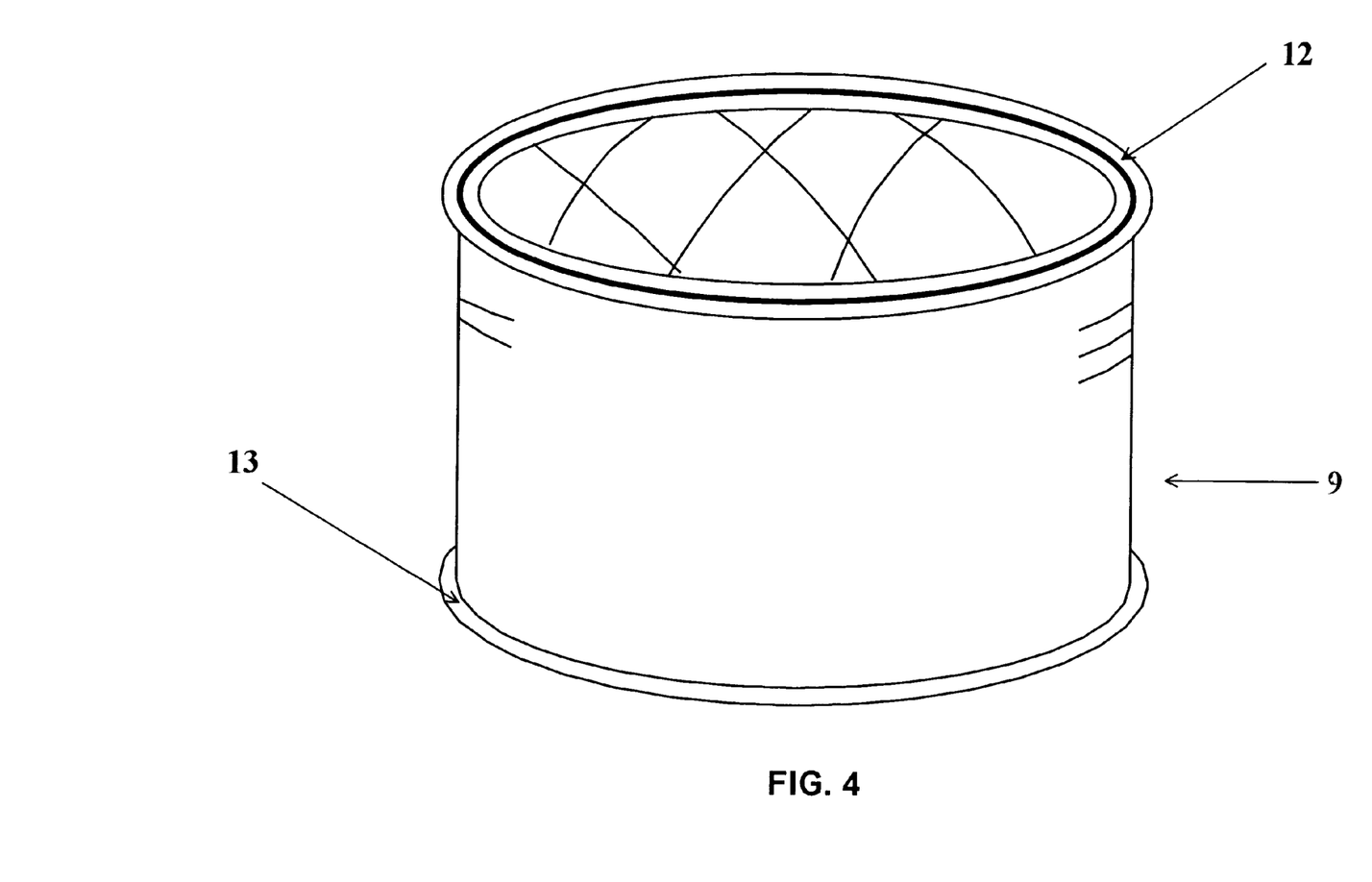
FIG. 4 is a view of an individual composite shell section.

A composite shell or shroud assembly 9 and 10 consisting of a single or multiple sections is then lowered over the satellite assembly, and is attached to the base ring 5 and sealed with clamps 14, as shown in FIG. 3. Sections of the composite shell are stacked and sealed to enclose the entire height of the satellite or payload as depicted. By clamping or bolting the connecting flanges 13 of the composite sections, the polymer gasket seals 12 provide airtight seals that protect the cargo from airborne and liquid contaminates, and afford the ability to maintain a positive-pressure nitrogen purge within the enclosure. An aluminum lid 11 is attached to the top section. The satellite apparatus is then fully enclosed by the airtight protective composite shell. FIG. 4 shows a grid-stiffened composite shell section 9 with the gasket/rubber seals 12 used to enclose the payload. Composites provide strength-to-weight ratio advantages over metal structures, and can be less expensive to manufacture.

Figure 5:
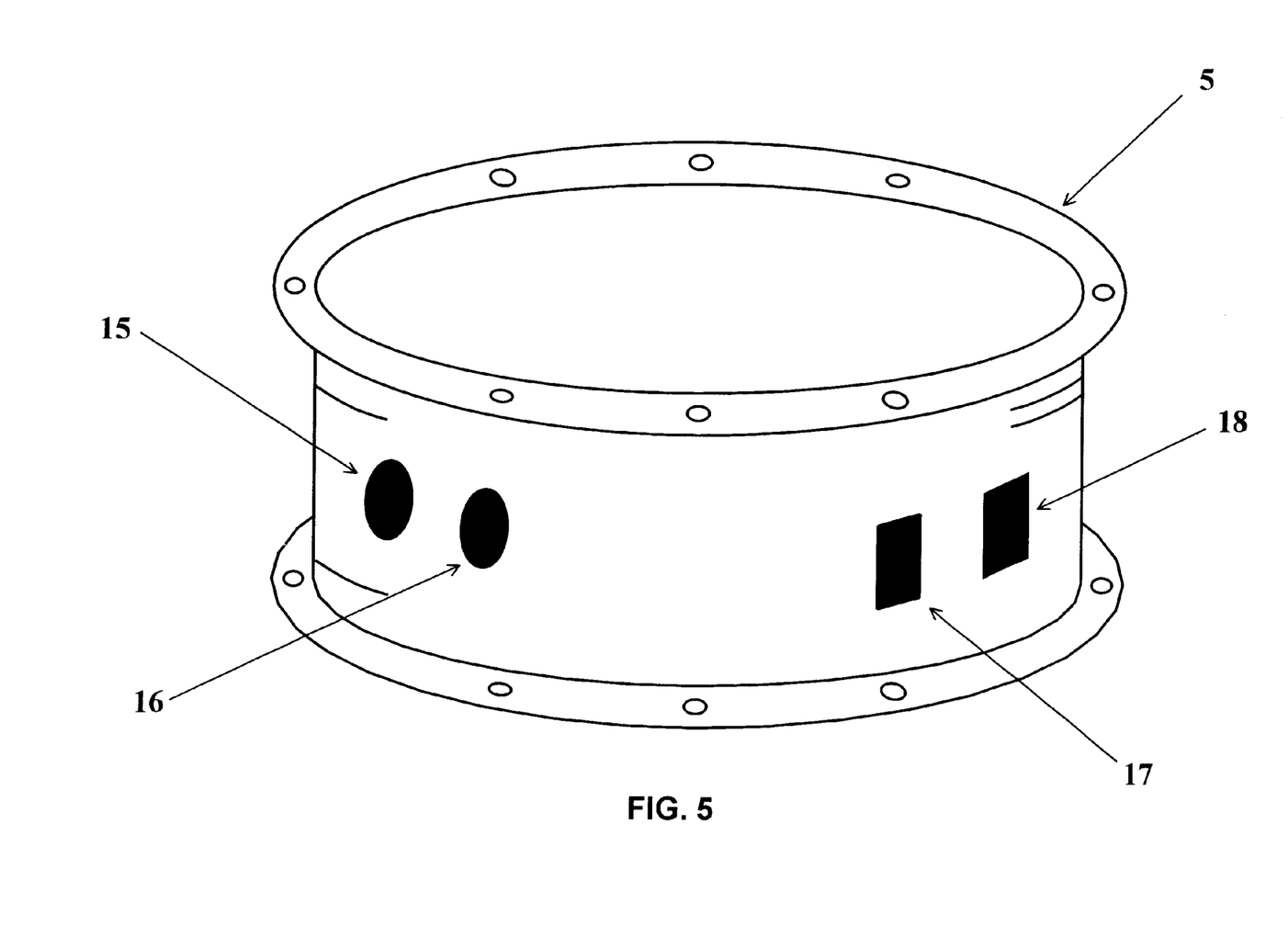
FIG. 5 is a view of the base ring apparatus showing the nitrogen purge inlet and outlet valves, power supply connection, and monitoring system connection.
Figure 6:
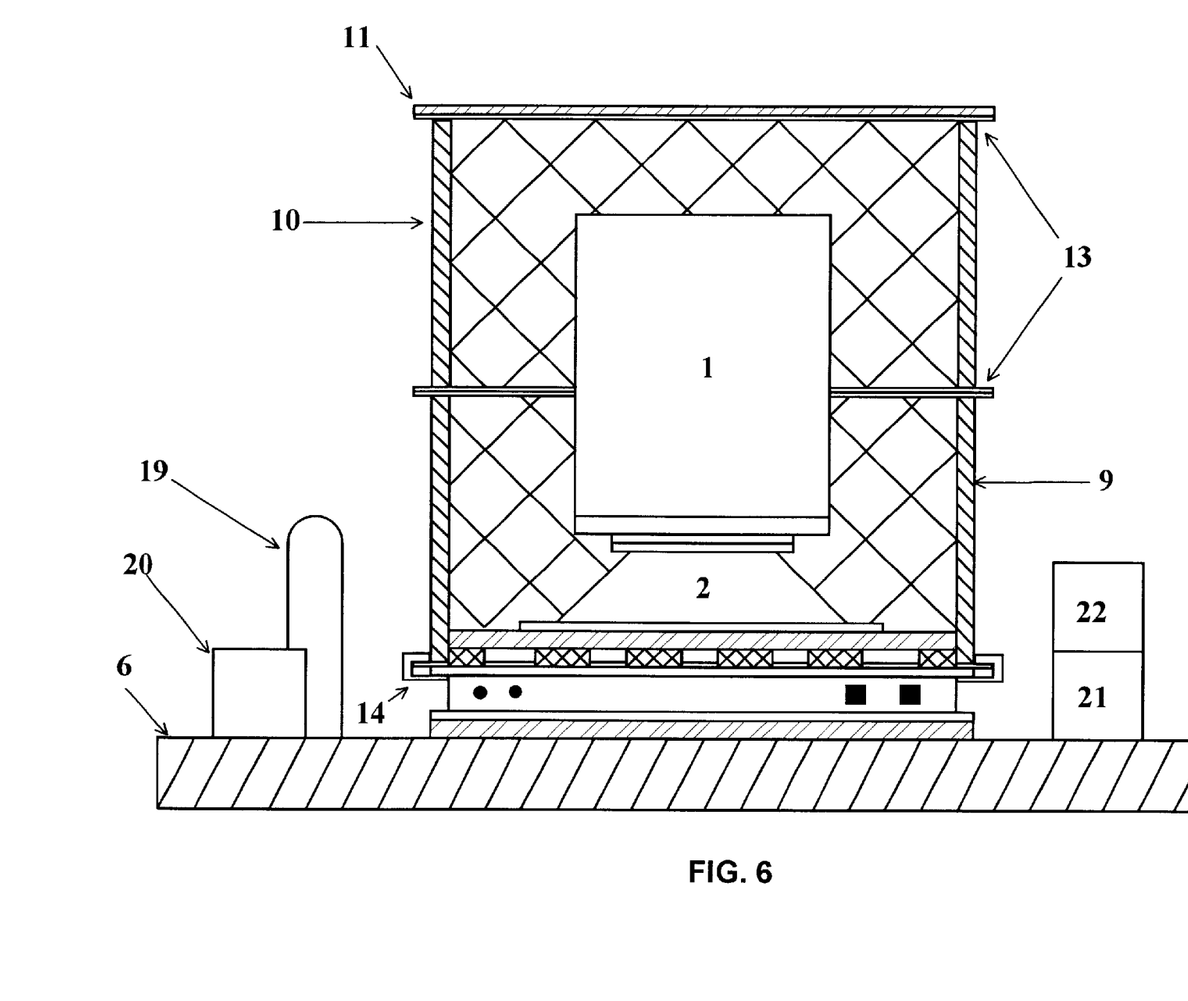
FIG. 6 shows a fully integrated satellite and container system.

A detailed view of the base ring 5 is shown in FIG. 5. Using the input valve 15 and the output valve 16 in the base ring 5, a positive-pressure nitrogen gas ($N_2$) purge system can be implemented. This reduces the chance of the satellite being exposed to humidity and air-borne contaminates. The nitrogen gas can also be heated or cooled by an exterior heating and cooling system 20 (FIG. 6) to maintain a desired temperature range. An alternative method for heating the interior of the composite container is to use resistive heating strips attached to the interior of the container. Power can be supplied to these heating strips through a connection 17 in the base ring 5. Additionally, temperature and vibration sensors can be added to the interior of the container, which can be monitored by external hardware connected through a port 18 in the base ring 5. The external monitoring system 22 can record sensor time histories and events, control temperature and nitrogen flow rates, and alert attending personnel in the event of a possible problem. FIG. 6 depicts the integrated system with the nitrogen supply tanks 19, the heating and cooling system 20, the power converter and battery apparatus 21, and the sensor and monitoring apparatus 22. The power converter apparatus permits the use of power from a variety of AC and DC sources, such as those found on an airplane or a truck.

Figure 7:
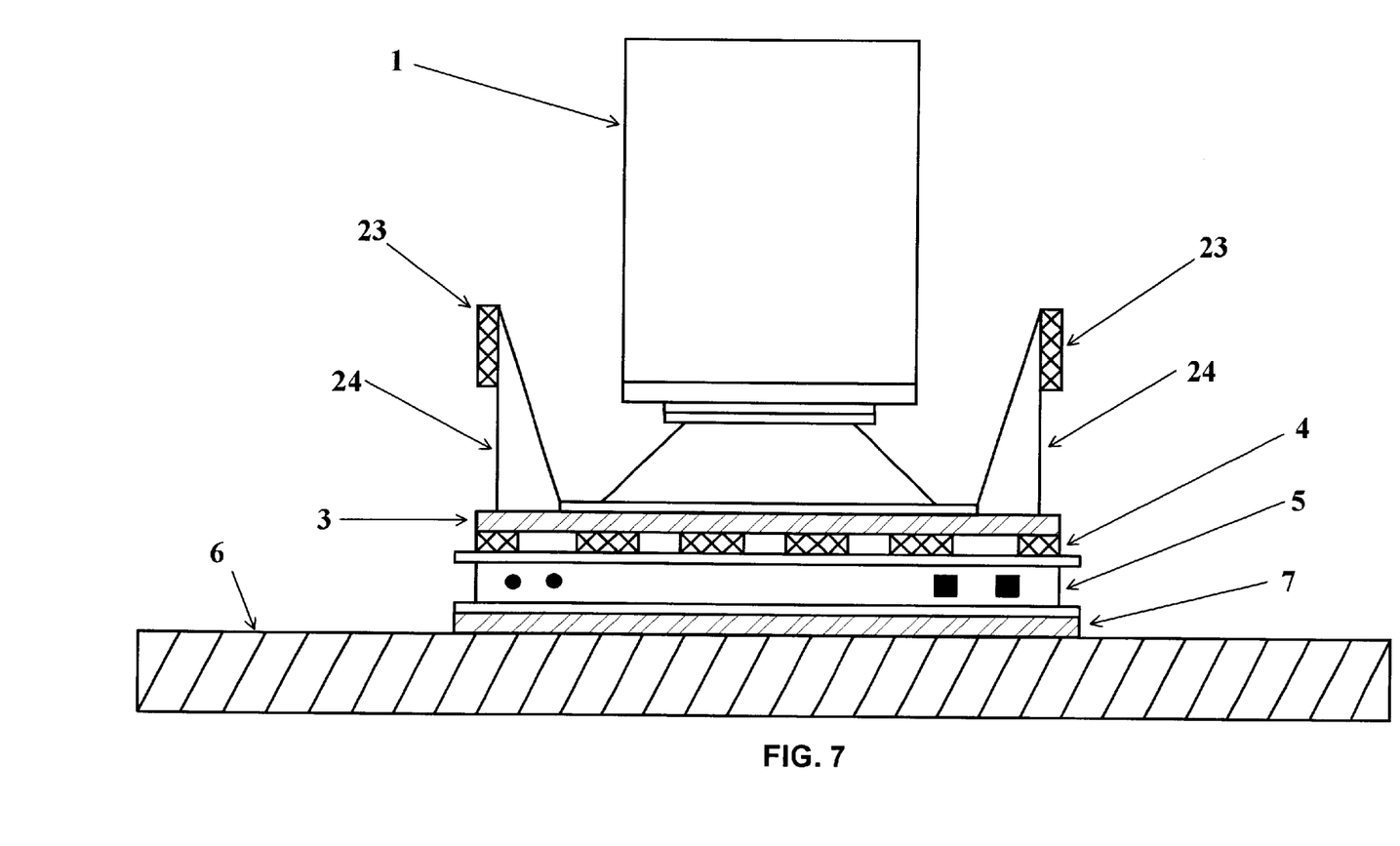
FIG. 7 illustrates the satellite mounting assembly incorporating transverse/lateral vibration isolators.

An additional embodiment of this invention, shown in FIG. 7, incorporates transverse/lateral vibration isolators 23 that are attached to support assemblies 24, which are mounted to the mounting platform 3. This provides additional protection from lateral shock and vibration, and reduces lateral motion and displacement.

Figure 8:
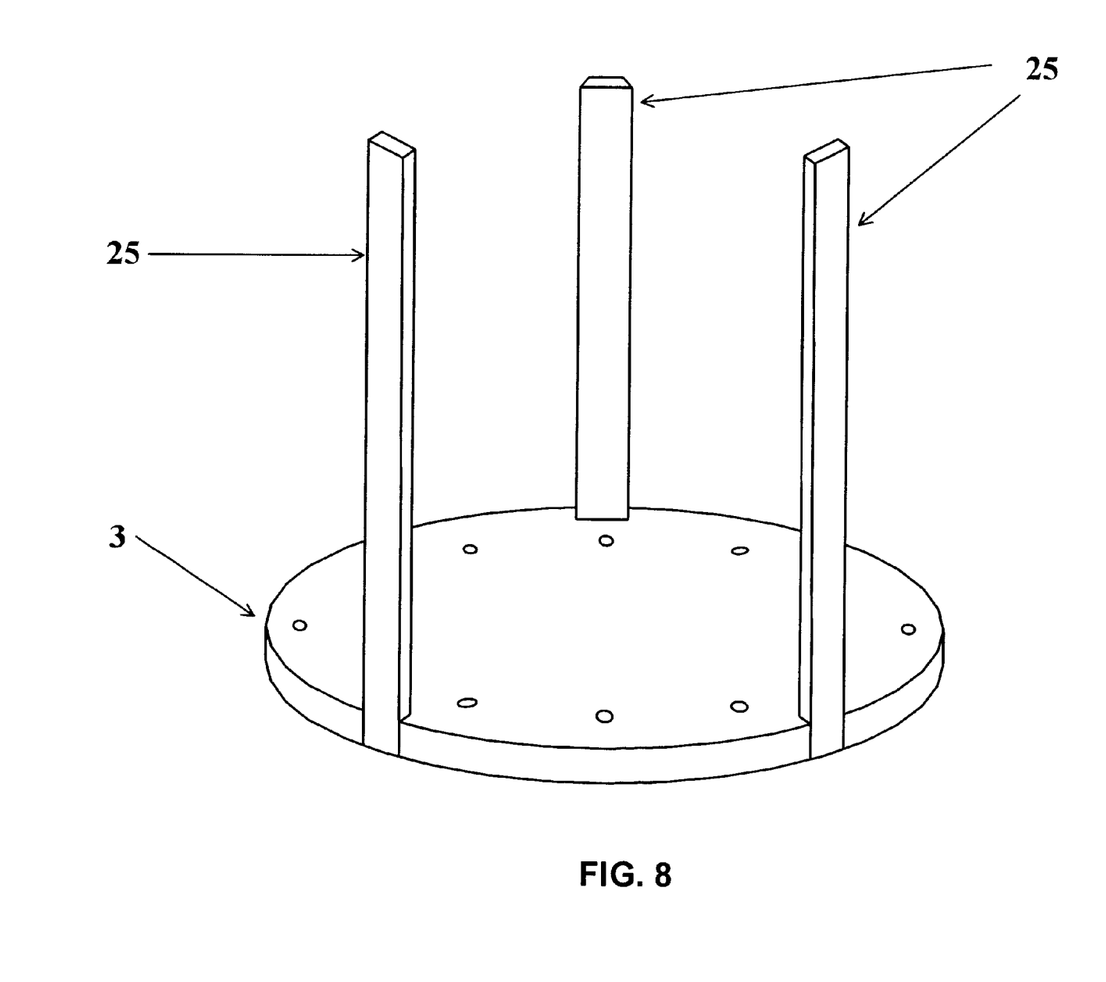
FIG. 8 is a view of an alternate embodiment using vertical support structures.

A further embodiment of this invention, shown in FIG. 8, incorporates multiple vertical support structures 25, which are attached to the mounting platform 3, and provide a guide for easily stacking the container sections and also reinforce the structure.

Figure 9:
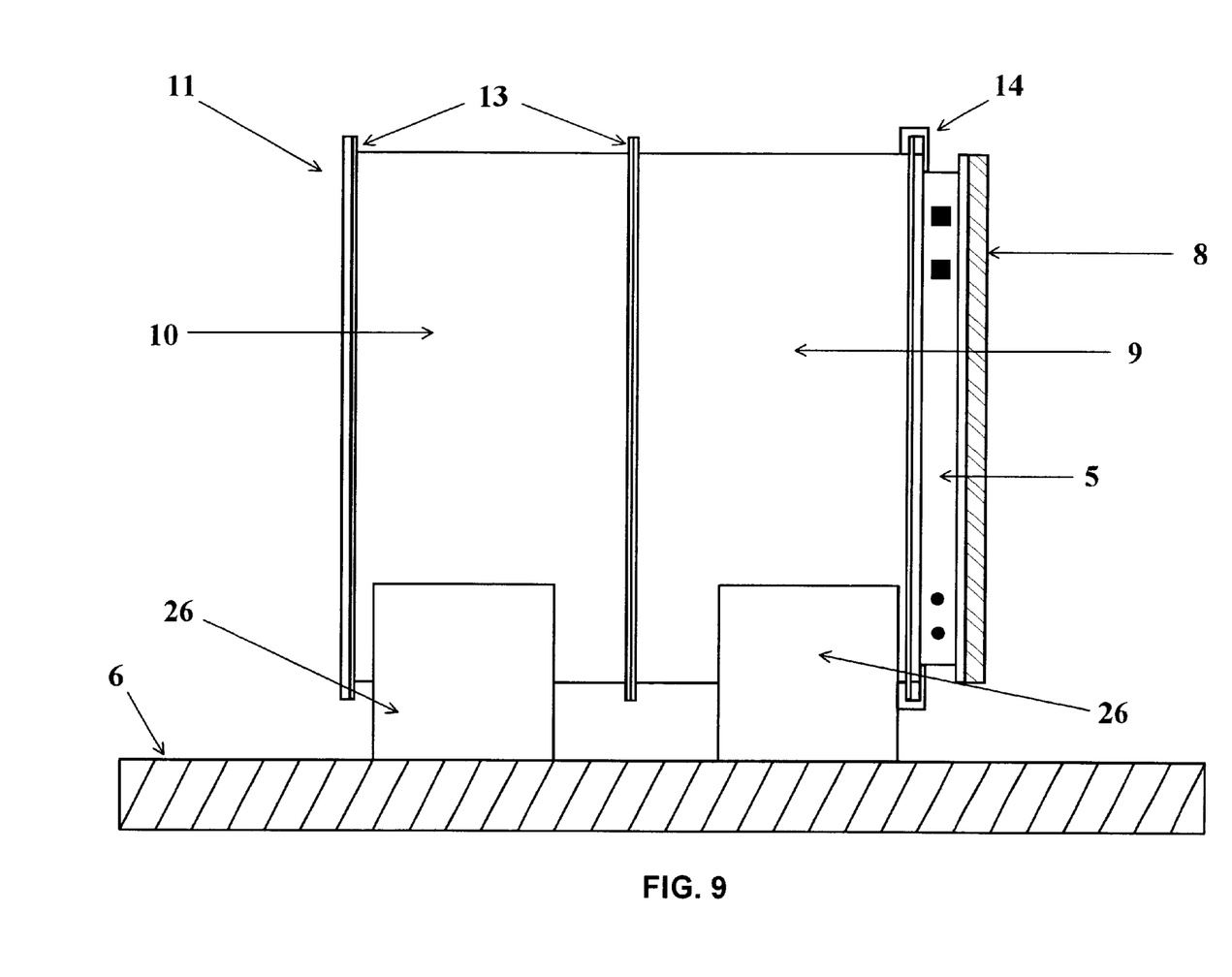
FIG. 9 is a side-view of an alternate embodiment where the container is mounted horizontally.
Figure 10:
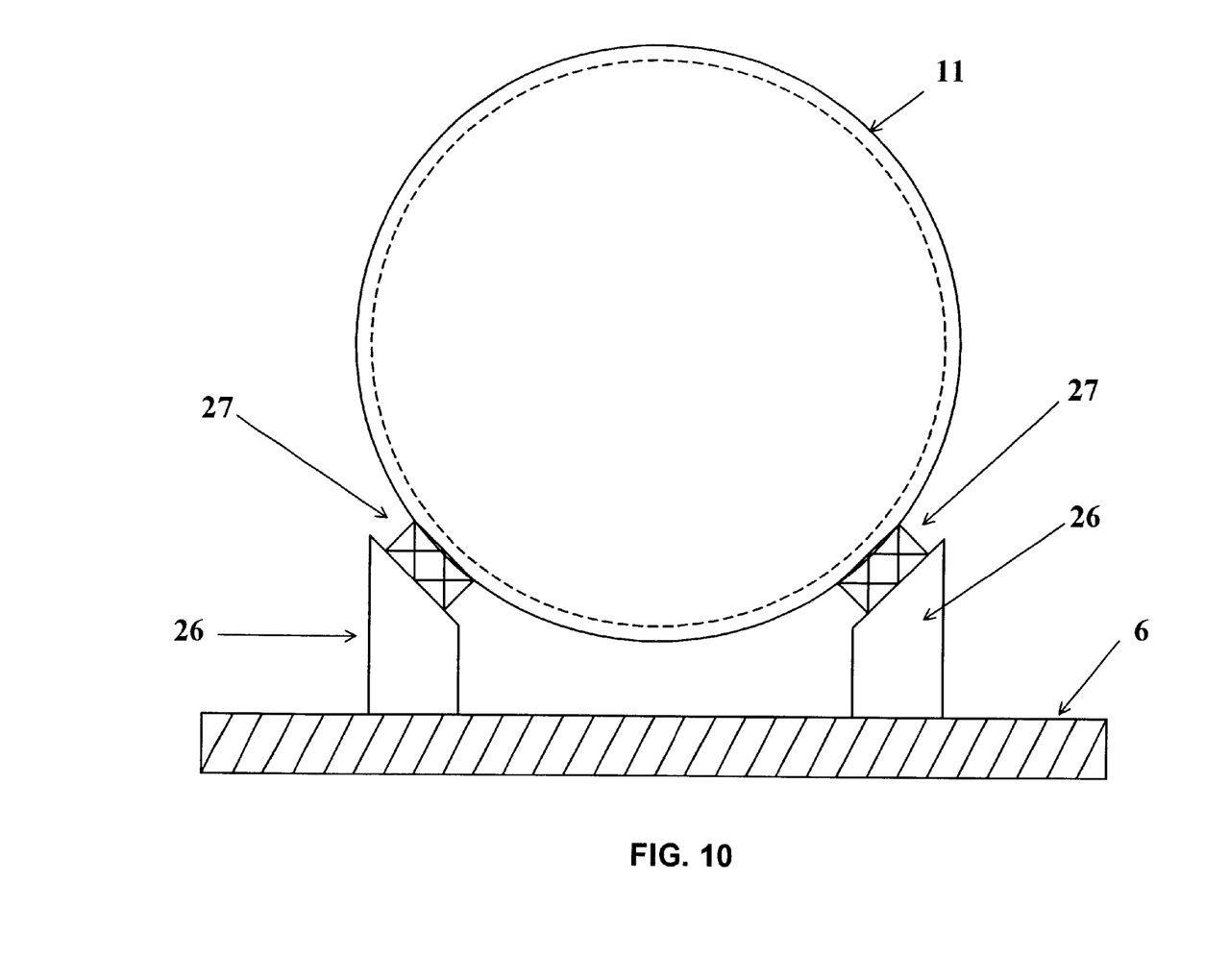
FIG. 10 is a front-view of an alternate embodiment where the container is mounted horizontally.

An additional embodiment of this invention provides that the apparatus is mounted horizontally as opposed to vertically, as shown in FIG. 9 and FIG. 10. The mounting platform 3 is directly attached to the mounting ring 5, and the container is sealed using gasket seals and an aluminum plate 8. The apparatus is attached to the pallet 6 by multiple support structures 26 and isolators 27.

Figure 11:
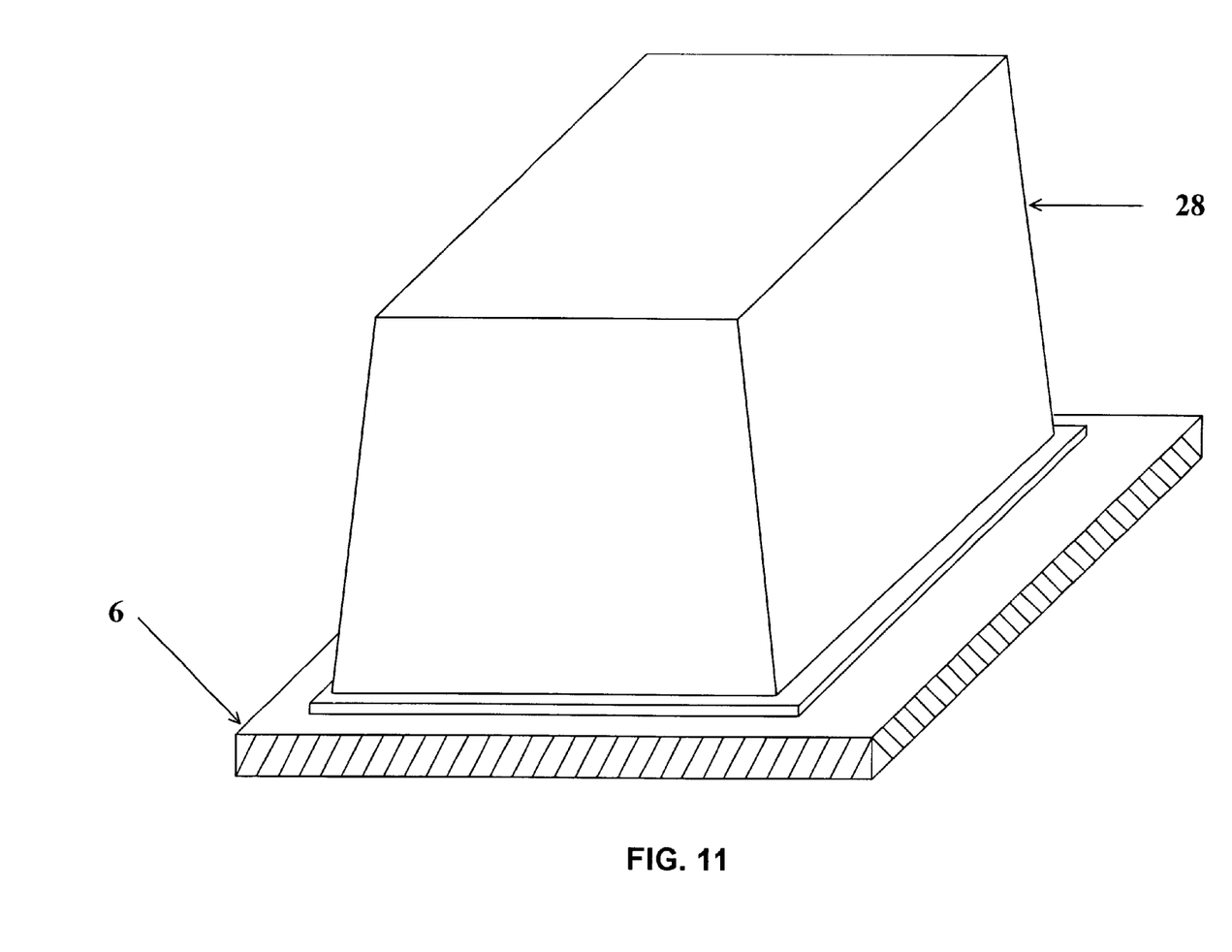
FIG. 11 is a view of a further embodiment that incorporates an exterior cover.

An additional embodiment of this invention provides for the use of an additional exterior shell or protective covering 28, as shown in FIG. 11.

Figure 12:
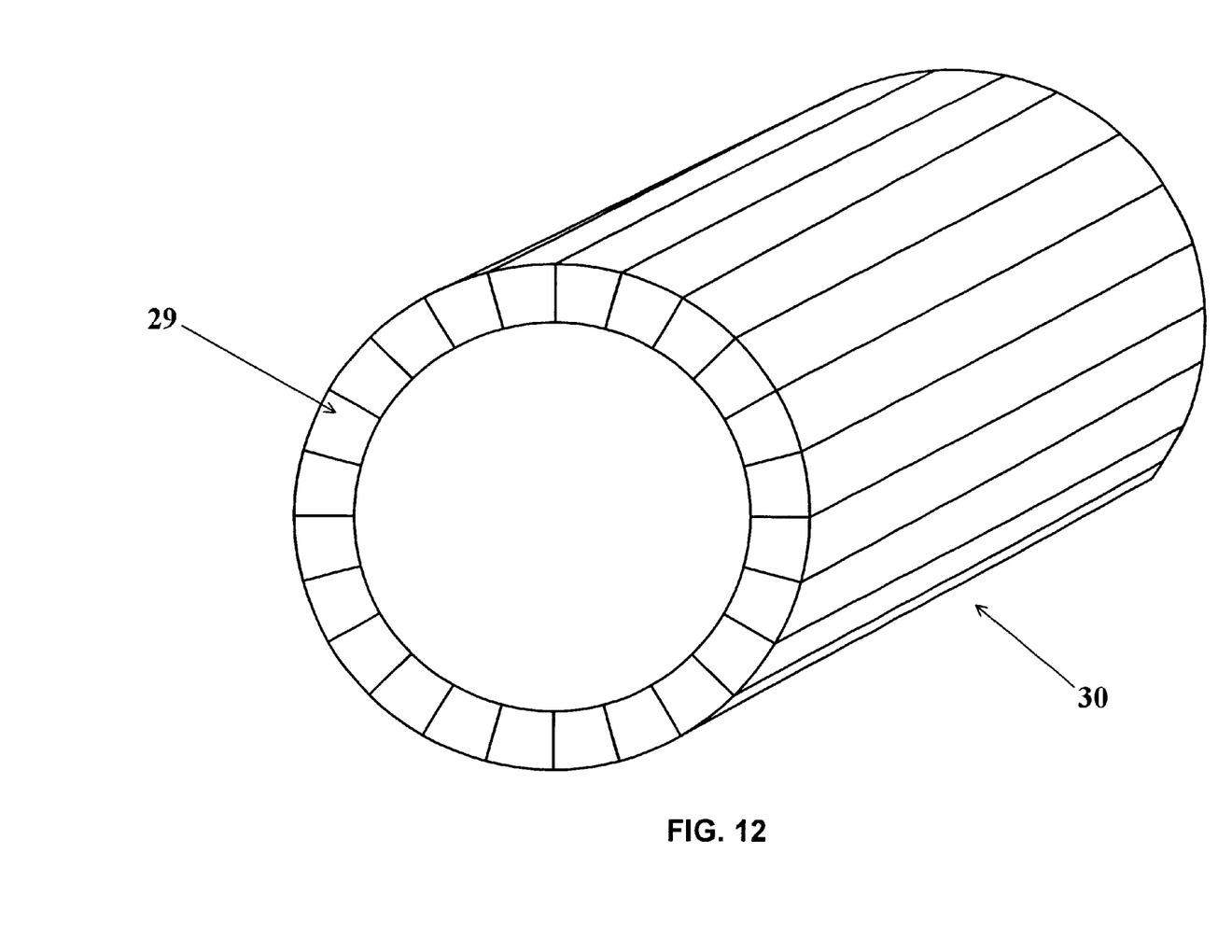
FIG. 12 shows a ChamberCore structure that can be used as the composite shell section.

Another variation provides that the composite shell sections 9 and 10 are constructed using ChamberCore (FIG. 12). ChamberCore is a composite structure developed by the Air Force Research Laboratory, whereby the structure is constructed using hollow sections 29 formed from composite material and cured to form a single unit 30 as shown in FIG. 12. This offers increased strength with less weight and reduces manufacturing cost and time.

The monitoring system can employ a system to alert attendants in the event of a system failure or a significant event. The method of alert can include but is not limited to calling cellular phones, pagers, signal beacons, or any other means of contacting relevant personnel.

The modular transport container might also include a protective apparatus, device, or shielding mechanism to provide protection to the cargo from static discharge and/or electromagnetic interference and signals.

We claim:

1. A modular transport container for launch vehicle payloads/adapter ring assemblies providing vibration isolation, temperature, humidity, and air quality environment control, said container comprised of:

a. a mounting assembly interposed between the payload adapter ring and a transport palet, said mounting assembly comprised of a circular mounting platform having a top surface, a bottom surface, and openings for the passage of a gas with the payload adapter ring being attached to said platform's top surface, a plurality of adjustable vibration isolators interposed between the bottom surface of said circular mounting platform and a base ring, said base ring having at least one input and output valve for the passage of a gas, and a gasket seal to provide an airtight seal between the pallet and the base ring;

b. an environmental cover assembly comprised of a plurality of cylindrically-shaped shroud sections having gasket seals at the top and bottom of each section whereby airtight seals can be obtained, the first-shroud section being lowered over the satellite and mounting assembly and attached to the base ring and successive shroud sections being attached as necessary to enclose the payload, and a lid attached to the top shroud section; and c. external systems for maintaining the desired environment comprised of a positive pressure gas purge system, means for maintaining a desired temperature within the modular container, monitor sensing means for measuring temperature, humidity, and vibration levels, and power source means for operating said external systems.

2. The modular transport container of claim 1, wherein said positive pressure gas purge system uses nitrogen gas.

3. The modular transport container of claim 2, wherein said means for maintaining a desired temperature consists of means for heating or cooling the gas of the positive pressure purge system.

4. The modular transport container of claim 2, wherein a plurality of transverse/lateral vibration isolators are connected to support assemblies attached to said mounting platform to moderate lateral vibrations.

5. The modular transport container of claim 1, wherein said gasket seal is replaced by a bottom plate and said adjustable isolators are instead positioned between said bottom plate and said pallet.

* * * * *